Feb. 10, 1948. L. J. PAGE 2,435,636

SEMIRIMLESS OPHTHALMIC MOUNTING

Filed Dec. 27, 1943

Inventor
Louis John Page

Patented Feb. 10, 1948

2,435,636

UNITED STATES PATENT OFFICE 2,435,636

SEMIRIMLESS OPHTHALMIC MOUNTING

Louis John Page, Hollis, N. Y.

Application December 27, 1943, Serial No. 515,835

3 Claims. (Cl. 88—47)

This invention relates to improvements in ophthalmic mountings and more particularly it has reference to the type of mounting having an arcuate arm to support the lens, the temple and the nose pad.

This invention is a continuation in part of my co-pending patent applications, Serial No. 354,800, filed August 30, 1940, entitled "Semi rimless spectacles"; and Serial No. 490,035, filed June 8, 1943, entitled "Ophthalmic mountings"; in which is claimed an ophthalmic mounting comprising arcuate arms and means for attaching lenses to same. These applications have resulted in Patents No. 2,343,574, dated March 7, 1944, and No. 2,376,977, dated May 29, 1945, respectively.

The feature of ophthalmic mountings comprising arcuate arms to support the lenses has depended upon various means of lens attachment. Lens attachments of the type in which the lens is provided with a hole have comprised a strap having ears and a shoe. In this invention a strap ear or lug supports the lens in combination with a novel arrangement of the parts.

One of the objects of this invention is to provide an ophthalmic mounting of the semi rimless type that will relieve destructive strain to the lenses. Another object of this invention is to provide a mounting to which lenses can be easily mounted. Another object of this invention is to provide a mounting that is flexible in respect to securing the lenses in alignment. A further object of this invention is to provide a mounting that is practical and economical to manufacture, better looking, inconspicuous, comfortable to wear and adjustable to different sizes.

These and other objects and advantages reside in novel features of construction, arrangement and combination of parts which will be fore fully described and pointed out in the appended claims.

Referring to the drawing.

Now referring more particularly to the drawing, like characters designate corresponding parts in the several views.

Figure 1:
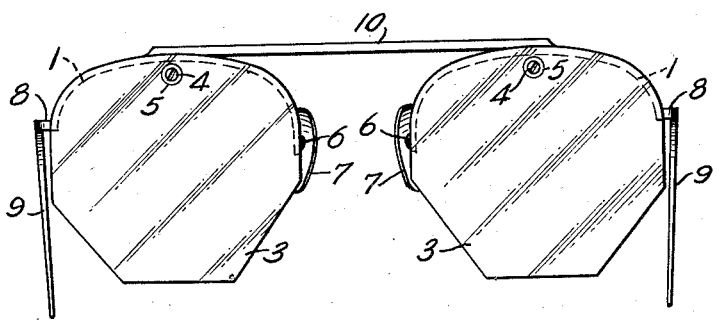
Figure 1 is a front elevation of an ophthalmic mounting embodying my invention.
Figure 2:
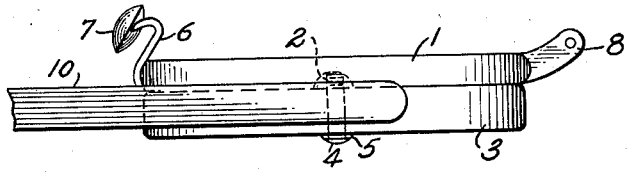
Figure 2 is a fragmentary top view of the mounting shown in Figure 1, the temple being removed.

Referring to Figures 1 and 2 the arcuate arm 1 is provided with a radially extending lug 2 having a threaded hole. The lens 3 is provided with a hole and attached to the lug 2 by any suitable means. I prefer to use a screw 4 which is inserted thru a washer 5, thru the hole in the lens and threaded into the lug 2. The arcuate arm 1 is directed along the rear surface of the lens 3 and shaped to the contour of the periphery of the lens. The arcuate arm 1 terminates at the nasal side of the lens in a nose pad support 6 to which is attached a nose pad 7 and at the temporal side of the lens in an endpiece 8. A temple 9 is pivotally mounted to the endpiece 8. A bridge 10 connects the arcuate arms 1. The bridge 10 is attached to the arcuate arms 1 so that portions of the bridge 10 engage the edge of the lens 3 on each side of the hole in the lens.

It is to be particularly noted that the bridge functions as a shoe on the edge of the lens, securing the lens in horizontal alignment. The side portions of the arcuate arm function as a brace by engaging the rear surface of the lens, aiding the bridge to maintain engagement with the edge of the lens when subjected to strain.

In the device above described several sizes of lenses can be fitted to one size of arcuate arm. By taking the stock from the side portions of the arcuate arm the central portion can be lengthened and a larger lens accommodated. By putting the stock from the central portion of the arcuate arm into the side portions a smaller lens can be accommodated. Similarly the distance between the nose pads is altered.

Figure 3:
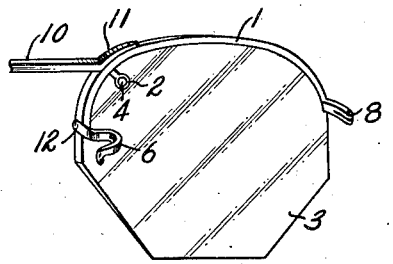
Figure 3 is a fragmentary rear perspective view of a modification of my invention, the temple and nose pad being removed.
Figure 4:
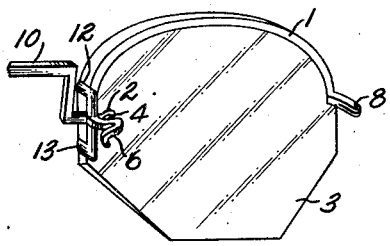
Figure 4 is a fragmentary rear perspective view of another modification of my invention, the temple and nose pad being removed.
Figure 5:
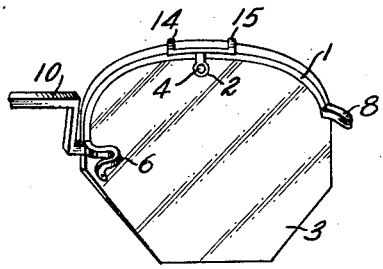
Figure 5 is a fragmentary rear perspective view of another modification of my invention, the temple and nose pad being removed.

Now referring to the modifications shown in Figures 3, 4 and 5, the lens 3 is provided with a hole and attached to the lug 2 by any suitable means. The lug 2 is radially connected to the arcuate arm 1. The arcuate arm 1 is directed along the rear surface of the lens 3 and shaped to the contour of the periphery of the lens. The lens edge engaging means 11, 12; 12, 13 and 14, 15 in Figures 3, 4 and 5 respectively tensionally engages the edge portions of the lens 3 securing the lens in position. The arcuate arm 1 tensionally engages the rear surface of the lens 3 upon securing the lens to the lug 2. The lens edge engaging means and the positioning of the lug 2 are shown in various preferred arrangements.

In Figure 3 the edge of the lens 3 is engaged by a continuation of the bridge 10 shown as 11 and by a continuation of the nose pad arm 6 shown as 12. The continuation portions 11 and 12 may be separate parts soldered or welded to the arcuate arm. I prefer to make such portions integral parts of the bridge and nose pad arm respectively. An endpiece 8 is attached to the temporal end of the arcuate arm 1. It should be noticed that the type of attachment of the lens to the lug 2 will allow the lens to pivot slightly upon the securing means. The arcuate arm 1 tensionally holds of the portions 11 and 12 overlying the edge of the lens against the edge of the lens on each side of the lug 2 securing the lens in horizontal alignment.

In Figure 4 the edge of the lens 3 is engaged by a continuation of the nose pad arm 6 and by a continuation of the arcuate arm 1. In this modification of my invention the bridge 10, arcuate arm 1, nose pad arm 6 and the lug 2 are assembled at a common junction. The nose pad arm 6 extends rearwardly and terminates in a suitable means to attach a nose pad. The other end of the nose pad arm 6 is directed along the arcuate arm 1 and then redirected forwardly as shown at 12. The arcuate arm 1 continues beyond the junction of the parts and then is directed forwardly as shown at 13. The other end of the arcuate arm 1 is directed along the rear surface of the lens and shaped to the contour of the periphery of the lens, terminating at the temporal side in an endpiece 8. The action of the portions 12 and 13 against the edge of the lens secures the lens in horizontal alignment.

In Figure 5 the edge of the lens 3 is engaged by the flanges 14 and 15 which form the side members of a U-shaped part. The central portion of the U-shaped part is directed along the arcuate arm 1 and attached so that the center is in substantial alignment with the center of the lug 2. The flanges 15 and 14 can be made as individual units each connected to the arcuate arm. A bridge 10 and the nose pad arm 6 are attached to the nasal end of the arcuate arm 1. An endpiece 8 is attached to the temporal end of the arcuate arm 1. The action of the portions 14 and 15 against the edge of the lens secures the lens in horizontal alignment.

The materials used for the several parts may be resilient, pliable, rigid or of any suitable nature. I prefer to make the arcuate arm of a resilient material so that the parts engaging the edge of the lens will flex when the lens is accidently struck. To provide for this flexing action the arcuate arm is more curved when the lug 2 is not connected to the lens than when it is connected to the lens.

It is to be particularly noted that the lens edge engaging means are independent of the lug 2 and therefore a most desirable specification of the parts can be made; that the arcuate arm extends on each side of the lug 2 and functions as a brace for the lug 2; that the arcuate arm braces the lens edge engaging means; that the tension of the lens edge engaging means against the edge of the lens can be regulated by adjusting the arcuate arm.

It can now be seen that I have provided an ophthalmic mounting in which the several objects of my invention are accomplished.

I have shown and described several of the preferred embodiments of my invention and it is understood that many modifications can be made without departing from the spirit of my invention and that the specification and drawing are illustrative of my invention and not limiting.

I claim:

1. In an ophthalmic mounting, a lens, an arcuate arm having a radially attached lug, said arcuate arm being disposed at the rear of and adjacent the edge of said lens and following a portion of the contour thereof, means attaching said lens to said lug, a bridge, said bridge being attached to said arcuate arm and extending along said arcuate arm on the temporal side of said lug, said bridge having a portion overlying the edge of said lens on the temporal side of said lug, a nose pad support member, said member being attached to said arcuate arm at a spaced distance along said arcuate arm from said lug and on the nasal side thereof, said member having a portion overlying the edge of the lens, said bridge portion and said member portion overlying the edge of said lens being urged into engagement with the edge of the lens by said arcuate arm.

2. In an ophthalmic mounting, a lens, an arcuate arm having a radially attached lug, said arcuate arm being disposed at the rear of and adjacent the edge of said lens and following a portion of the contour thereof, means attaching said lens to said lug, means engaging the edge of said lens on the temporal side of the lens attachment, a nose pad support member, said member being attached to said arcuate arm at a spaced distance along said arcuate arm from said lug and on the nasal side thereof, said member having a portion overlying the edge of said lens and urged into engagement with the edge of the lens by said arcuate arm, securing said lens in horizontal alignment.

3. In an ophthalmic mounting, a lens, an arcuate arm having a radially attached lug, said arcuate arm being disposed at the rear of and adjacent the edge of said lens and following a portion of the contour thereof, said lens being attached to said lug, a bridge, said bridge being attached to said arcuate arm and having a portion overlying the edge of said lens on the temporal side of the lens attachment, means overlying the edge of said lens, said means being attached to said arcuate arm at a spaced distance along said arcuate arm from said lug and on the nasal side of the lens attachment, said bridge portion and said means overlying the edge of the lens being urged into engagement with the edge of the lens by said arcuate arm, securing said lens in horizontal alignment.

LOUIS JOHN PAGE.

REFERENCES CITED

The following references are of record in the file of this patent:

UNITED STATES PATENTS

| Number | Name | Date |
|---|---|---|
| 2,057,855 | Stayman | Oct. 20, 1936 |
| 2,257,224 | Bouchard | Sept. 30, 1941 |
| 2,254,749 | Nerney | Sept. 2, 1941 |
| 2,223,646 | Splaine | Dec. 3, 1940 |
| 2,257,810 | Pomeranz et al. | Oct. 7, 1941 |
| Re. 21,574 | Sweeney | Sept. 17, 1940 |
| 1,972,479 | Ferris | Sept. 4, 1934 |
| 2,182,970 | Nerney | Dec. 12, 1939 |
| 2,277,118 | Leavitt | Mar. 24, 1942 |
| 2,362,726 | Slotsky | Nov. 14, 1944 |
| 2,366,659 | Uhlemann et al. | Jan. 2, 1945 |